(12) United States Patent
Butcka

(10) Patent No.: US 10,824,177 B2
(45) Date of Patent: *Nov. 3, 2020

(54) THERMAL WAX BYPASS VALVE UTILIZING RIGID SEAL CARRIER

(71) Applicant: Hamilton Sundstrand Corporation, Charlotte, NC (US)

(72) Inventor: William W. Butcka, Colchester, CT (US)

(73) Assignee: Hamilton Sundstrand Corporation, Charlotte, NC (US)

(*) Notice: Subject to any disclaimer, the term of this patent is extended or adjusted under 35 U.S.C. 154(b) by 23 days.

This patent is subject to a terminal disclaimer.

(21) Appl. No.: 16/195,373

(22) Filed: Nov. 19, 2018

(65) Prior Publication Data

US 2020/0159261 A1    May 21, 2020

(51) Int. Cl.
*G05D 23/13* (2006.01)
*F16K 1/32* (2006.01)

(52) U.S. Cl.
CPC ............ *G05D 23/132* (2013.01); *F16K 1/32* (2013.01)

(58) Field of Classification Search
CPC ..... G05D 23/132; F16K 11/04; F16K 31/002; F16K 1/32
See application file for complete search history.

(56) References Cited

U.S. PATENT DOCUMENTS

| | | | |
|---|---|---|---|
| 2,873,633 A | 2/1959 | May | |
| 3,887,159 A * | 6/1975 | Obermaier | F03G 7/06 251/11 |
| 6,065,682 A * | 5/2000 | Frunzetti | F01P 7/16 236/12.15 |
| 6,457,652 B1 * | 10/2002 | Fukamachi | F01P 7/16 236/34.5 |
| 7,469,841 B1 | 12/2008 | Lamb et al. | |
| 9,133,952 B2 | 9/2015 | Lamb et al. | |
| 10,054,963 B2 * | 8/2018 | Lamb | F16H 57/0412 |
| 2008/0029246 A1 * | 2/2008 | Fratantonio | G05D 23/1333 165/103 |
| 2010/0126594 A1 * | 5/2010 | Sheppard | F16K 17/04 137/340 |
| 2012/0097750 A1 * | 4/2012 | Kusakabe | G05D 23/022 236/93 R |
| 2012/0247582 A1 * | 10/2012 | Lamb | F16K 11/044 137/468 |

(Continued)

OTHER PUBLICATIONS

European Search Report for EP Application No. 19209159.3 dated Mar. 25, 2020.

*Primary Examiner* — Kun Kai Ma
(74) *Attorney, Agent, or Firm* — Carlson, Gaskey & Olds, P.C.

(57) ABSTRACT

A bypass system has a source of a fluid to be cooled and a heat exchanger for selectively cooling fluid. A piston is moveable along an axis allowing movement of a valve poppet toward and away from the valve seat. The piston moves with a rigid seal carrier. The rigid seal carrier and the piston move within a valve housing. A wax element is disposed on an opposed axial side of the rigid seal carrier relative to a chamber, such that the wax element expands as a temperature of the fluid to be cooled increases, and causes the valve poppet to move against the valve seat. A bypass valve is also disclosed.

18 Claims, 2 Drawing Sheets

(56) References Cited

U.S. PATENT DOCUMENTS

| | | | |
|---|---|---|---|
| 2015/0211395 A1* | 7/2015 | Gooden | F01M 5/007 |
| | | | 165/280 |
| 2015/0315941 A1* | 11/2015 | Kim | F01M 5/007 |
| | | | 236/34.5 |
| 2015/0369113 A1* | 12/2015 | Arbel | F01P 7/16 |
| | | | 236/34.5 |
| 2016/0230901 A1* | 8/2016 | Kujawski, Jr. | G05D 23/022 |
| 2017/0211715 A1* | 7/2017 | Balmaceda | F28D 15/00 |
| 2017/0254604 A1* | 9/2017 | Sheppard | F01P 11/08 |
| 2017/0276056 A1* | 9/2017 | Spenny | F01P 7/16 |
| 2017/0284243 A1* | 10/2017 | Miyajima | F16K 31/002 |
| 2018/0010866 A1* | 1/2018 | Sheppard | F01M 5/002 |
| 2018/0017155 A1* | 1/2018 | Gooden | F01M 5/002 |
| 2018/0299913 A1* | 10/2018 | Sheppard | F16K 31/002 |
| 2020/0011351 A1* | 1/2020 | Lamb | F15B 11/0365 |
| 2020/0159261 A1* | 5/2020 | Butcka | G05D 23/1333 |
| 2020/0173742 A1* | 6/2020 | Butcka | G05D 23/1333 |

* cited by examiner

THERMAL WAX BYPASS VALVE UTILIZING RIGID SEAL CARRIER

BACKGROUND

This application relates to a seal that has a thermally responsive wax plug and wherein movement of the wax is constrained with a seal moving with a rigid seal carrier.

Valves are utilized in any number of modern fluid flow applications. One valve application controls a bypass on a line connecting a fluid to a heat exchanger. If the fluid is below a predetermined temperature, it may be inefficient to send the fluid to the heat exchanger. In such instances, the valve opens to bypass the fluid back to a sump or other source.

One type of valve for providing the selective bypass based upon the temperature of the fluid utilizes a wax element that expands when heated. When the wax is heated, it drives a valve against the seat and when the wax cools, it allows a spring assembly to move the valve to a bypass position.

In the existing valves, a rubber boot seals the wax within a portion of a chamber. The rubber boot may sometimes tear and this allows the wax to flow within the chamber.

SUMMARY

A bypass system has a source of a fluid to be cooled and a heat exchanger for selectively cooling fluid. A bypass valve is mounted on a line to selectively bypass fluid prior to reaching the heat exchanger. The bypass valve includes a valve poppet and valve seat. The valve further includes a piston moveable along an axis to, allowing movement of the valve poppet toward and away from the valve seat. The piston moves with a rigid seal carrier. The rigid seal carrier carries a seal at an outer periphery. The metal seal carrier and the piston move within a valve housing. The valve housing has a chamber formed on one axial side of the rigid seal carrier. A wax element is disposed on an opposed axial side of the rigid seal carrier relative to the chamber, such that the wax element expands as a temperature of the fluid to be cooled increases, and causes the valve poppet to move against the valve seat. The wax element cools if the temperature of the fluid to be cooled lowers such that the valve poppet can move away from the valve seat.

A bypass valve is also disclosed.

These and other features may be best understood from the following drawings and specification.

DETAILED DESCRIPTION

Figure 1:
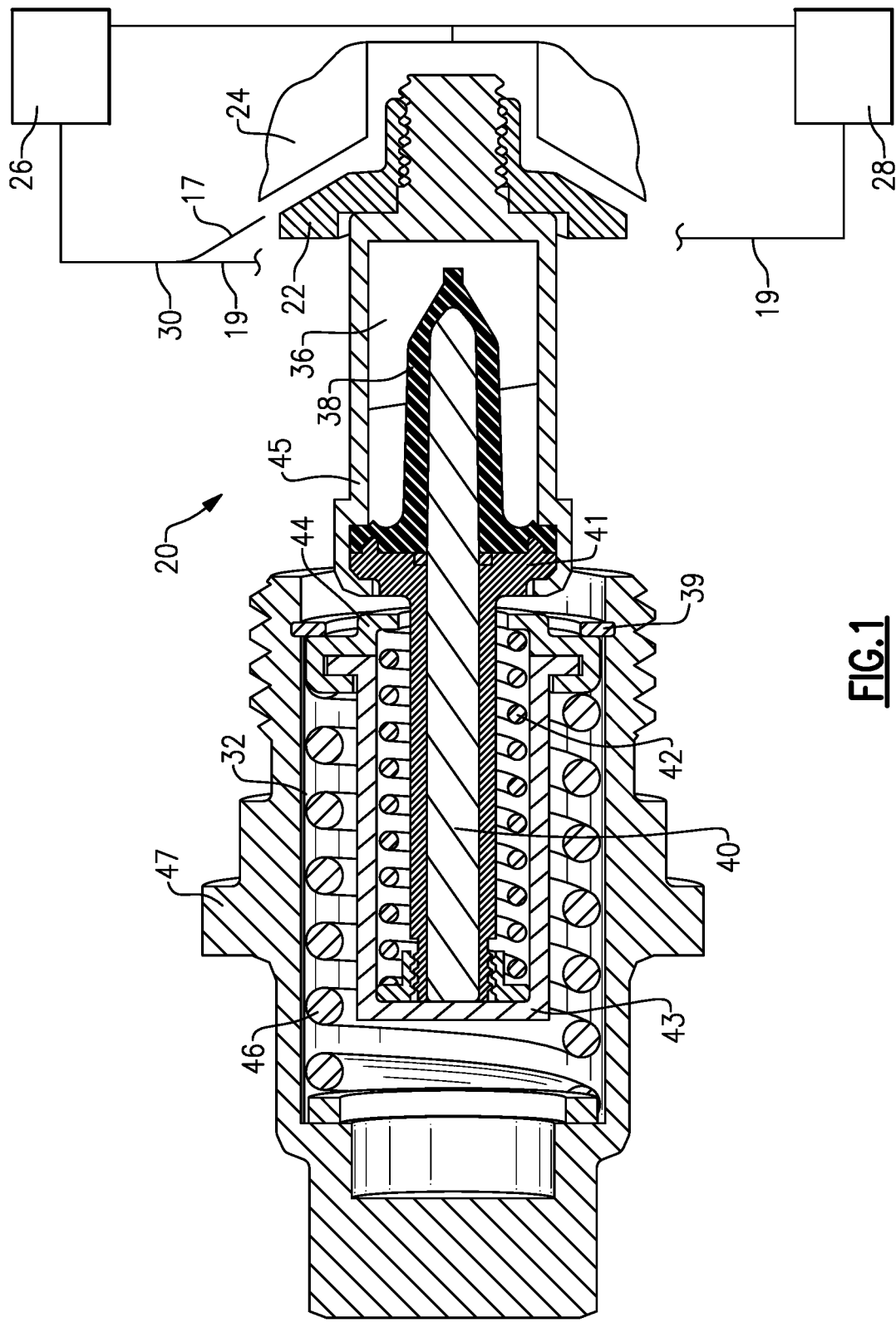
FIG. 1 shows an existing valve.

FIG. 1 shows a valve assembly 20 in a bypass system. A valve poppet 22 is selectively driven to seat on a valve seat 24. A source 26 selectively communicates a fluid to be cooled to a heat exchanger 28. When the valve poppet 22 is not seated on the seat 24, this fluid is allowed to bypass the heat exchanger 128 and return through line 17 to the source 26.

As shown, the bypass fluid in line 17 communicates with the line 19 which is the normal return line from the heat exchanger 28. These two flows combine into a line 30 heading back to the source 26. The source 26 could be a sump and an item that the oil is cooling such as a generator or other system.

Of course, this explanation is greatly simplified. One such fluid may be oil utilized to cool other components in a gas turbine engine although other bypass applications will benefit from this disclosure. It is only under certain conditions that the oil will reach a temperature where the cooling is necessary. It may be inefficient to cool the fluid at times when it is below a predetermined temperature. Thus, the bypass mode improves the efficiency by bypassing the heat exchanger under most operational conditions.

A valve piston 40 is received within a chamber in a valve housing 45. The valve housing is fixed with the valve poppet. Wax 36 is included in a chamber between the housing 45 and the piston 40, and a rubber boot 38 maintains the wax in the chamber. If the fluid passing towards the heat exchanger 28 exceeds a predetermined temperature, it will heat the valve housing 45 and thus the wax 36. The wax 36 will then expand forcing the piston 40 to the left in the Figure. The piston 40 is received within a piston guide 43. The piston 40 has a forward face 41 secured to the boot 38. The valve guide 43 has a forward face 44. A return spring 42 is in the valve guide 43. Another spring 46 is outward of the valve guide 43 and within an outer housing 47 and provides a pressure relief function. The housing 43 applies a force against the snap ring 39. As the piston 40 moves to the left with the wax 36 being heated, it eventually bottoms out on the bottom of the chamber in the valve guide 43, and forces the valve housing 45 and poppet 22 to the right from the FIG. 1 position.

The wax plug or element 36 may be a wax and copper powder combination. The inclusion of the copper assists in heat transfer and the melting of the wax to achieve the fine control of the position of the valve 22.

The rubber boot 38 seals the wax element 36 from the remainder of a chamber 39. As can be appreciated, it is desirable to maintain the wax element 36 in a position forward of the piston 34. When the wax heats, it becomes fluid. If the rubber boot 38 tears, the wax can leak into the chamber 39 adversely affecting the efficiency and speed of operation of the valve 20.

Figure 2:
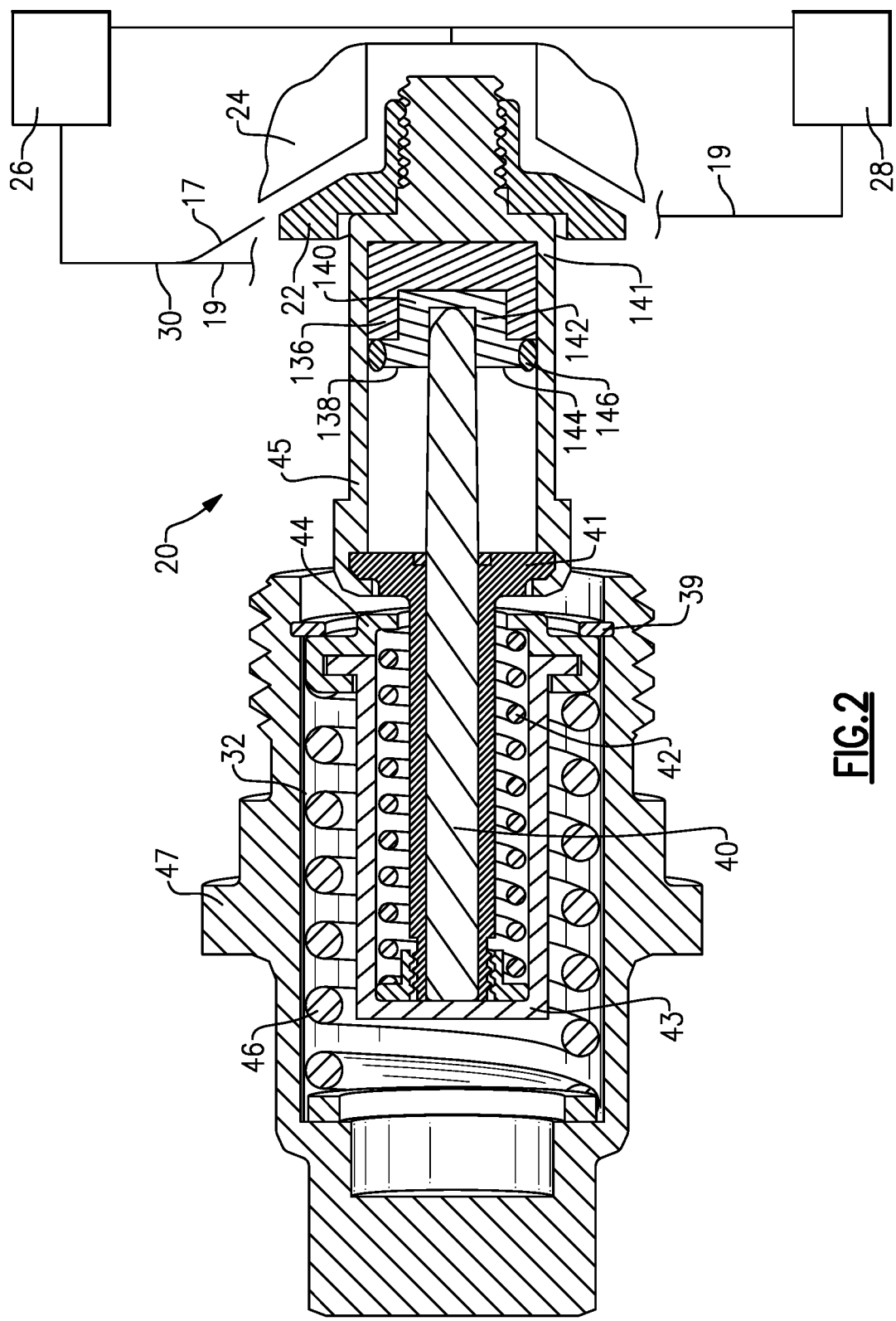
FIG. 2 shows an improvement to the existing valve.

FIG. 2 shows an alternative valve 120. In alternative valve 120, elements that are generally the same as the FIG. 1 elements are indicated with a numeral increased by 100.

In the valve 120, the rubber boot is replaced by a rigid seal carrier 138 carrying an outer seal 146. The rigid seal carrier may be formed of a stainless steel, or other appropriate materials. Suitable metals and plastics such as a PEEK may be utilized. Metal seal carrier 138 includes a forward face 140 which generally defines a plane perpendicular to a central axis of the valve 134, a cylindrical portion 142, and an end ear or brim 144.

The combination of surfaces 140/142/144 generally form a top hat shape. A seal 146 is formed at an outer periphery of the brim 144. Seal 146 may be formed of an elastomeric material, a metal, a plastic including PEEK (polyether ether ketone), or a carbon material, and other materials. The seal carrier 138 will be less likely to break or otherwise allow movement of the wax 136 past the seal 146 and, thus, the concern mentioned above with regard to FIG. 1 will be eliminated.

The seal carrier has a generally top hat shape with a forward planer portion extending generally perpendicularly to an axis of movement of the poppet. A cylindrical portion extends from the forward portion and in a direction away from the valve seat and a brim extending radially outwardly from the cylindrical portion.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A bypass system comprising:
a source of a fluid to be cooled and a heat exchanger for selectively cooling the fluid;
a bypass valve mounted on a line to selectively bypass fluid prior to reaching the heat exchanger if the fluid falls below a predetermined temperature, said bypass valve including a valve poppet and valve seat, said bypass valve further including a piston moveable along an axis allowing movement of said valve poppet toward and away from said valve seat, said piston moving with a rigid seal carrier, said rigid seal carrier carrying a seal at an outer periphery, and said rigid seal carrier and said piston moving within a valve housing, said valve housing having a chamber formed on one axial side of said rigid seal carrier, and a wax portion disposed on an opposed axial side of said rigid seal carrier relative to said chamber, such that said wax portion expands as a temperature of the fluid to be cooled increases, and causes said valve poppet to move against said valve seat and said wax portion cools if the temperature of the fluid to be cooled lowers such that said valve poppet can move away from said valve seat; and
wherein said piston is forced in a first axial direction away from said valve seat as said wax expands, and causes said valve housing to move with said valve head toward said valve seat.

2. The bypass system as set forth in claim 1, wherein said wax portion includes a wax and a powdered metal.

3. The bypass system as set forth in claim 2, wherein said rigid seal carrier is formed of a metal.

4. The bypass system as set forth in claim 3, wherein said seal is formed of one an elastomeric material, a metal, or a carbon material.

5. The bypass system as set forth in claim 4, wherein said rigid seal carrier has a top hat shape with a forward planer portion extending perpendicularly to an axis of movement of the poppet, a cylindrical portion extending from said forward planar portion and in a direction away from said valve seat and a brim extending radially outwardly from said cylindrical portion.

6. The bypass system as set forth in claim 5, wherein said seal is received on a radially outer portion of said brim.

7. The bypass system as set forth in claim 1, wherein said rigid seal carrier is formed of a metal.

8. The bypass system as set forth in claim 7, wherein said rigid seal carrier is formed of stainless steel.

9. The bypass system as set forth in claim 8, wherein said seal is formed of one an elastomeric material, a metal, or a carbon material.

10. The bypass system as set forth in claim 9, wherein said rigid seal carrier has a top hat shape with a forward planer portion extending perpendicularly to an axis of movement of the poppet, a cylindrical portion extending from said forward planar portion and in a direction away from said valve seat and a brim extending radially outwardly from said cylindrical portion.

11. The bypass system as set forth in claim 10, wherein said seal is received on a radially outer portion of said brim.

12. The bypass system as set forth in claim 1, wherein said rigid seal carrier has a top hat shape with a forward planer portion extending perpendicularly to an axis of movement of the poppet, a cylindrical portion extending from said forward planar portion and in a direction away from said valve seat and a brim extending radially outwardly from said cylindrical portion.

13. The bypass system as set forth in claim 12, wherein said seal is received on a radially outer portion of said brim.

14. The bypass system as set forth in claim 13, wherein said rigid seal carrier is formed of a metal.

15. The bypass system as set forth in claim 14, wherein said rigid seal carrier is formed of stainless steel.

16. The bypass system as set forth in claim 15, wherein said seal is formed of one an elastomeric material, a metal, or a carbon material.

17. The bypass system as set forth in claim 1, wherein said rigid seal carrier is formed of a metal.

18. A bypass valve comprising:
a valve poppet and valve seat, said bypass valve further including a piston moveable along an axis allowing movement of said valve poppet toward and away from said valve seat, said piston moving with a metal seal carrier, said metal seal carrier carrying a seal at an outer periphery, and said metal seal carrier and said piston moving within a valve housing, said valve housing having a chamber formed on one axial side of said metal seal carrier, and a wax portion disposed on an opposed axial side of said metal seal carrier relative to said chamber, such that said wax portion expands as a temperature of the fluid to be cooled increases, and causes said valve poppet to move against said valve seat and said wax portion cools if the temperature of the fluid to be cooled lowers such that said valve poppet can move away from said valve seat;
said metal seal carrier is formed of stainless steel, said seal is formed of one an elastomeric material, a metal, a plastic, or a carbon material, said metal seal carrier has a top hat shape with a forward portion extending generally perpendicularly to an axis of movement of the piston, a cylindrical portion extending from said forward portion and in a direction away from said valve seat and a brim extending radially outwardly from said cylindrical portion, said seal is received on a radially outer portion of said brim; and
wherein said piston is forced in a first axial direction away from said valve seat as said wax expands, and causes said valve housing to move with said valve head toward said valve seat.

* * * * *